No. 686,556. Patented Nov. 12, 1901.
J. A. SWINEHART & W. A. BYRIDER.
MEANS FOR SECURING ELASTIC TIRES TO WHEELS.
(Application filed Apr. 24, 1901.)
(No Model.)

Witnesses:
Walter Bowman
Maude Zinsler

Inventors:
James A. Swinehart,
William A. Byrider,
By Humphrey & Humphrey,
Attorneys.

UNITED STATES PATENT OFFICE.

JAMES A. SWINEHART AND WILLIAM A. BYRIDER, OF AKRON, OHIO.

MEANS FOR SECURING ELASTIC TIRES TO WHEELS.

SPECIFICATION forming part of Letters Patent No. 686,556, dated November 12, 1901.

Application filed April 24, 1901. Serial No. 57,253. (No model.)

*To all whom it may concern:*

Be it known that we, JAMES A. SWINEHART and WILLIAM A. BYRIDER, citizens of the United States, residing at Akron, in the county of Summit and State of Ohio, have invented a certain new and useful Improvement in Means for Securing Elastic Tires to Wheels; of which the following is a specification.

Our invention has relation to improvements in means for uniting solid rubber vehicle-tires securely in channeled metallic tires, so as to prevent creeping or play of the rubber tire in the metal tire and to thus avoid not only displacement but chafing and wear of the rubber tire against the bottom and sides of the channel of the metal tire.

The object of our invention is to provide new and improved means for uniting the solid rubber tire with the channeled metallic tire which shall be simple in construction, easily applied, and effective and durable in operation.

To the accomplishment of the aforesaid object our invention consists in the peculiar and novel construction, arrangement, and combination of parts hereinafter described and then specifically pointed out in the claims, reference being had to the accompanying drawings, which form a part of this specification.

Figure 1:
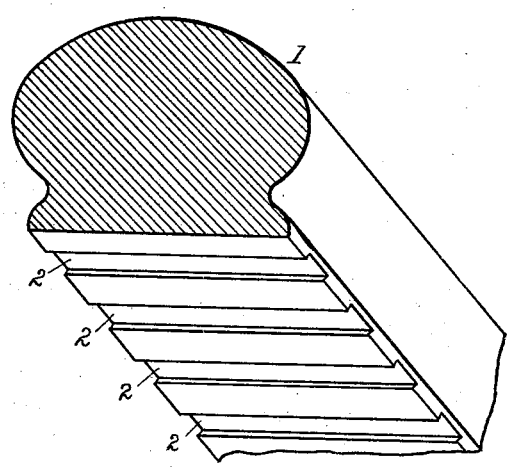
Figure 2:
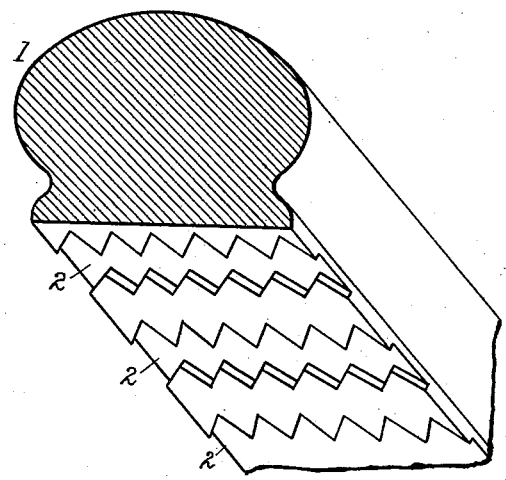
Figure 3:
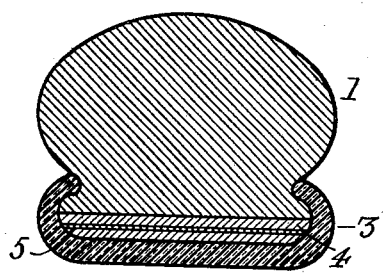

In the accompanying drawings, in which similar reference-numerals indicate like parts in the different views, Figure 1 is one form of tire adapted to be united with a metal tire by our improved means; Fig. 2, a modified form of fastening-grooves; Fig. 3, a section of the form shown in Fig. 1 united with a channeled tire, and Fig. 4 a modified form of the fastening-openings.

Referring to the figures, 1 is a rubber tire having in section a flat base and a rounded tread portion, the sides between the tread and base being inwardly curved. In the base or inner periphery of the rubber tire shown in Figs. 1 and 3 are transverse dovetailed grooves 2, arranged at intervals. The metal tire 3 has a flat bottom with inwardly-curved side flanges, the upper halves being conformed to receive and fit the lower part of the rubber tire. The bottom of the tire 3 is first covered with a layer of cement 4, on which is laid a strip of canvas or duck 5, upon which is an additional layer of cement. The rubber tire 1 having been placed in position by any of the well-known means, heat is applied to the metal tire to cause the cement to become softened and united into a solid mass. Upon cooling the rubber tire is thus provided with a hard or rigid base in firm interlocking union with the channeled tire.

In the form shown in Fig. 2 the same method of uniting the parts is used, the zigzag form of the grooves facilitating the filling in and retention of the cement and preventing any shifting or creeping of the tire.

Figure 4:
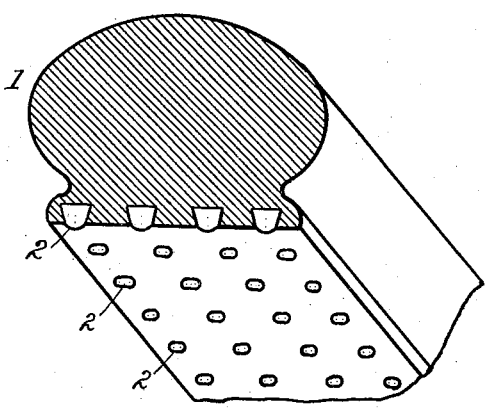

In the form shown in Fig. 4 the rubber tire has cavities in its base in form of truncated conical holes to receive the cement, and it is applied and secured in the same manner as the preceding forms.

Any suitable substance that will fuse at a temperature so low as not to injure the rubber may be employed as a cement; but asphaltum will be found best adapted to the purpose.

Having thus described our invention, what we claim, and desire to secure by Letters Patent, is—

1. An improved means of securing solid rubber tires to wheels which consists in providing the wheel with a channeled metal tire, and a rubber tire adapted to rest in said channeled tire and having in its inner periphery grooves or openings to receive a retaining material; partially filling the channel of the metal tire with a cement adapted to be fused by heat at a lower degree than that required to melt the rubber and fusing said material during the process of placing the tires in union, substantially as shown and described.

2. An improved vehicle-tire consisting of a channeled metallic tire, and a rubber tire resting therein having openings to receive a retaining compound, and a fusible cement interposed in said metallic tire and the openings of said rubber tire, substantially as shown and described.

3. An improved vehicle-tire consisting of a metallic tire, a rubber tire adapted to surround said metallic tire, openings in said rubber tire and a fusible cement adapted to enter the openings in said rubber tire and to attach itself to said metallic tire, substantially as shown and described.

In testimony that we claim the above we hereunto set our hands in the presence of two subscribing witnesses.

JAMES A. SWINEHART.
WILLIAM A. BYRIDER.

In presence of—
C. E. HUMPHREY,
C. P. HUMPHREY.